United States Patent [19]

Shirasaka et al.

[11] Patent Number: 5,377,257
[45] Date of Patent: Dec. 27, 1994

[54] FACSIMILE RECEIVING METHOD AND FACSIMILE APPARATUS CARRYING OUT THE METHOD

[75] Inventors: Manabu Shirasaka, Katsuta; Teiji Okamoto, Fujisawa; Fumitaka Ito, Inba; Yasuyuki Kozima, Hitachi, all of Japan

[73] Assignee: Hitachi, Ltd., Tokyo, Japan

[21] Appl. No.: 972,551

[22] Filed: Nov. 6, 1992

[30] Foreign Application Priority Data

Nov. 8, 1991 [JP] Japan .................. 3-291800
Mar. 19, 1992 [JP] Japan .................. 4-063269

[51] Int. Cl.⁵ ............................ H04M 11/00
[52] U.S. Cl. ........................... 379/67; 379/93; 379/100
[58] Field of Search ............... 379/100, 93, 67

[56] References Cited

U.S. PATENT DOCUMENTS

| | | | |
|---|---|---|---|
| 4,660,218 | 4/1987 | Hashimoto | 379/102 |
| 4,800,439 | 1/1989 | Yoshino | 358/257 |
| 4,802,204 | 1/1989 | Chang | 379/100 |
| 4,868,865 | 9/1989 | Ogawa | 379/67 |
| 4,910,764 | 3/1990 | Bowen | 379/100 |
| 4,974,254 | 11/1990 | Perine | 379/67 |
| 4,994,926 | 2/1991 | Gordon | 379/100 |
| 5,014,296 | 5/1991 | Saigano | 379/67 |
| 5,033,078 | 7/1991 | Andoh | 379/100 |
| 5,038,226 | 8/1991 | Nagaishi | 379/100 |
| 5,048,073 | 9/1991 | Weiser | 379/67 |
| 5,050,005 | 9/1991 | Kagami | 379/100 |
| 5,086,455 | 2/1992 | Satomi | 379/67 |
| 5,090,049 | 2/1992 | Chen | 379/100 |
| 5,091,932 | 2/1992 | Tsuda | 379/100 |
| 5,131,026 | 7/1992 | Park | 379/67 |
| 5,151,972 | 9/1992 | Lorenz | 379/67 |
| 5,185,783 | 2/1993 | Takahashi | 379/93 |
| 5,208,850 | 5/1993 | Kino | 379/67 |

FOREIGN PATENT DOCUMENTS

| | | |
|---|---|---|
| 0515685A1 | 12/1992 | European Pat. Off. . |
| 58-197956 | 11/1983 | Japan . |
| 62-180667 | 8/1987 | Japan . |
| 63-098266 | 4/1988 | Japan . |
| 1022160 | 1/1989 | Japan . |
| 2268058 | 11/1990 | Japan . |
| WO9115915 | 4/1991 | WIPO . |

*Primary Examiner*—James L. Dwyer
*Assistant Examiner*—Michael N. Lau
*Attorney, Agent, or Firm*—Antonelli, Terry, Stout & Kraus

[57] ABSTRACT

A facsimile apparatus which carries out ringing of a telephone first for calling, and transmits a voice message informing of "absence" and "facsimile receivable" to a calling station when offhook is not detected during a predetermined period. The facsimile apparatus also transmits a called station identification signal CED after a silence interval of about 5 seconds. When the calling station onhooks a handset during the period of ringing of the telephone by judging that the called station is absent, a fee for a telephone call will not be charged. Furthermore, by setting the silence interval, the CED signal after the voice message is prevented from being heard by the calling station.

25 Claims, 8 Drawing Sheets

FACSIMILE RECEIVING METHOD AND FACSIMILE APPARATUS CARRYING OUT THE METHOD

BACKGROUND OF THE INVENTION

The present invention relates to a facsimile receiving method and a facsimile apparatus. More specifically, the invention relates to a receiving method suitable for a household facsimile apparatus for switching a telephone line to talking or facsimile and an apparatus for that purpose.

According to a conventional household facsimile apparatus, a telephone line is switched to a telephone set or a facsimile apparatus for common use and answering of facsimile is switched to manual or automatic by a switch. The switch is set to the manual position for ordinary talking. When facsimile is received with the switch set at the manual position, a conversation including, for example, "transmission of facsimile" is carried out first and then facsimile is received. When a person is at a called station, the above manual position is suitable. On the other hand, when no person is at a called station, the switch is switched to the automatic position so as to automatically receive facsimile.

FIG. 5 is a sequence drawing of the above automatic answering of facsimile.

Firstly, based on dialing of a calling station, a telephone central office transmits a call signal 31 to a facsimile apparatus of a called station, and when a handset of the called station is picked up (offhook) within a period during which the call signal is repeated, for example, about 6 times, ordinary talking is carried out. When the handset of the called station is not offhooked during this period, no fee for a telephone call is charged.

When the handset of the called station is not offhooked during the above period, the called station sends back a message (MSG) 32 of, for example, "Wait a little moment." which is stored beforehand to the calling station, waits for arrival of a CNG (calling tone) signal which is a sign of transmission of facsimile during the next period of call signal 33, transmits a CED (calling station identification) signal meaning that facsimile can be received to the calling station when the CNG signal is detected, and starts receiving of facsimile immediately. After the above MSG 32 is sent, a fee for a telephone call is charged because the line is connected so as to wait for the CNG signal.

When the above CNG signal is not sent, the called station sends back a message (MSG) 34 of, for example, "I am out now. Please phone later once again or transmit a facsimile message now." to the calling station after the end of a predetermined period of call signal 33 and then transmits a CED signal 35. The calling station receives the above CED signal and starts transmission of facsimile.

Furthermore, during the period of call signal 33, the call signal is transmitted so as to continue ringing until the CED signal is sent, so that the handset of the called station can be offhooked during this period so as to carry out talking.

Furthermore, the number of ring tones (RT) or ringback tones (RBT) generated during the period of call signal 31 can be changed by the switch.

A telephone line may be automatically switched to an automatic answering telephone set or a facsimile apparatus. In this case, there are two methods available; one is that the facsimile apparatus automatically receives a call in the same way as with the above mentioned and the automatic answering telephone set is called when no facsimile is sent and the other is that the automatic answering telephone set receives a call first and the telephone line is switched to the facsimile apparatus when facsimile is transmitted so as to receive facsimile.

When the automatic answering telephone set does not answer because it is full of incoming messages which have been recorded, the former method sends a facsimile CED signal after stop of the call signal, and the latter method allows the facsimile apparatus to automatically receive a call and to send a facsimile CED signal.

According to the aforementioned conventional facsimile apparatus, the line is connected so as no 10 continue ringing during the period of call station 33. Therefore, although talking cannot be carried out when no person is at the called station, the calling station is billed.

Furthermore, the number of ringings during the calling period 31 is set by a combination of a plurality of switches, so that the operation is complicated.

Furthermore, in the case of combination of the aforementioned facsimile apparatus and automatic answering telephone set, when the automatic answering telephone set is full of incoming messages recorded, the called station sends a CED signal to the calling station immediately and starts receiving of facsimile, so that the calling station suddenly hears a strange sound of the above CED signal and the person at the calling station who does not know the situation is surprised.

SUMMARY OF THE INVENTION

An object of the present invention is to provide a facsimile receiving method and facsimile apparatus, which are free from the above problems, and which are kind to a person who makes a telephone call, realize a simple operation for a user of the facsimile apparatus, and are suited to a consumer facsimile apparatus with a high use frequency of telephone.

To solve the above problems, according to the present invention, for a facsimile calling tone signal (CNG signal) from a calling station, a called station carries out ringing of telephone for a predetermined period without answering facsimile and sends a message meaning "Absence" and "Transmit a facsimile message, if any" to the calling station by voice when the called station does not offhook the handset during this period.

Furthermore, according to an embodiment of the present invention, a silence interval is set behind the above message, and a called station identification signal (CED signal) is transmitted after the interval, and the above offhook detection is continued in the above message interval and the above silence interval.

Furthermore, according to an embodiment of the present invention, the above CNG signal is detected at least in the above silence interval.

Furthermore, according to an embodiment of the present invention, the frequency component of the above CNG signal is removed from the above message voice.

Furthermore, when a telephone line is shared by an automatic answering telephone set and a facsimile apparatus which are automatically switched, the called station sends a message indicating "absence" to the calling station by voice when the automatic answering telephone set of the called station is full of incoming messages recorded and switches the facsimile to automatic incoming when the automatic answering telephone set of the called station is not offhooked during a predetermined period.

Furthermore, according to an embodiment of the present invention, the number of ringings during the calling period before the above facsimile apparatus is switched to automatic incoming can be set by one-touch operation.

Furthermore, according to an embodiment of the present invention, an operation mode in which the above ringing period of telephone before the facsimile apparatus is switched to automatic incoming is omitted is set.

DETAILED DESCRIPTION OF THE PREFERRED EMBODIMENTS

Figure 1:
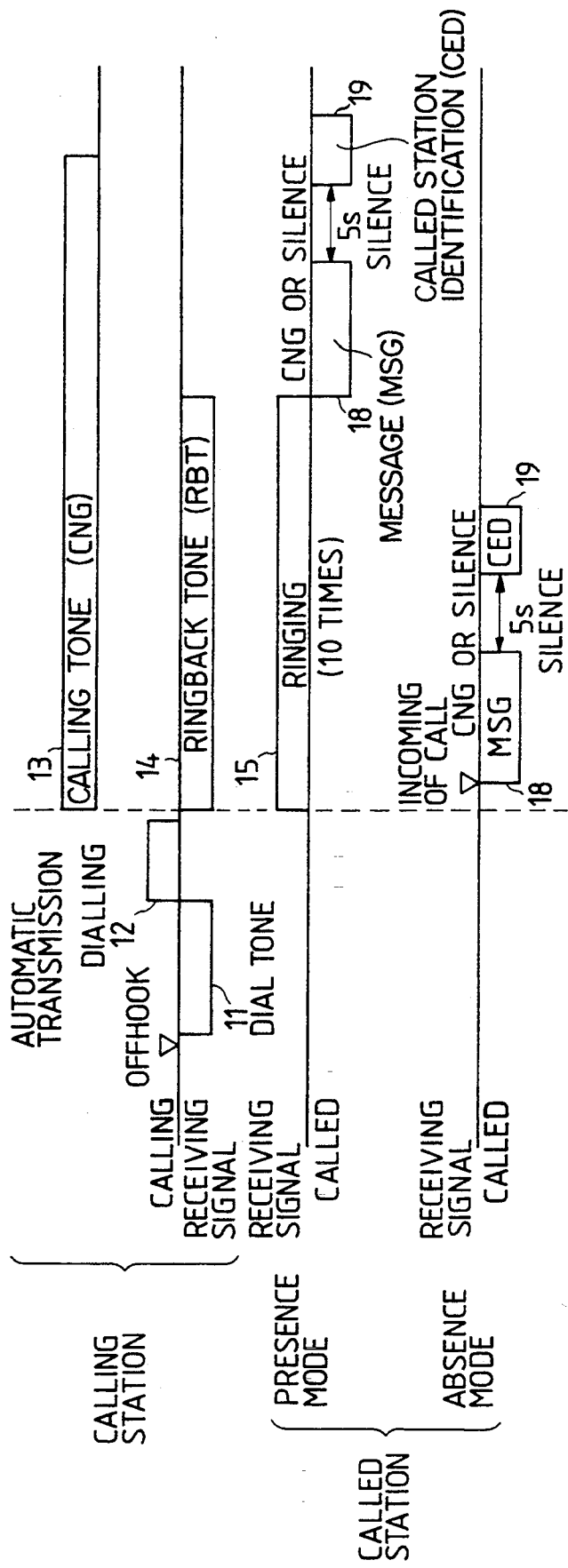
FIG. 1 shows signal timing charts of calling and called stations of an example of the facsimile receiving method of the present invention.

The dotted line shown in FIG. 1 indicates the point of time that a calling station finishes dialing. When the dialing is finished, the calling station transmits a facsimile calling tone signal CNG 13 or waits for offhook of the called station.

The called station rings the bell of the telephone set so as to continue ringing for a predetermined calling period 15.

A facsimile apparatus according to an embodiment of the present invention has a switch for specifying the presence or absence mode. In the presence mode, when offhook of the called station is not obtained during the calling period 15, the called station automatically switches the line to "Facsimile", sends a message (MSG) 18 to the calling station so as to notify it of "absence", and gives up talking.

Furthermore, the called station continues ringing the telephone set of the called station also during sending of the message 18 and allows talking when the handset of the called station is offhooked during this period.

When the handset of the called station is not offhooked before the end of the MSG 18, the called station transmits a CED signal 19 after a silence interval of about 5 seconds and receives facsimile. By setting the above silence state, the calling station will not be surprised to hear a strange sound of the CED signal when the message 18 ends and can afford to onhook the handset.

Figure 5:
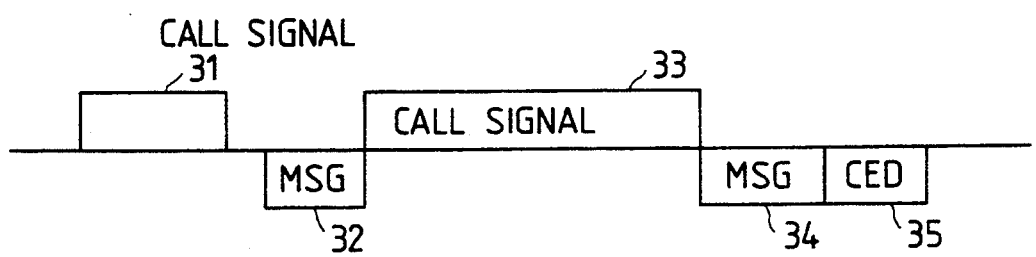
FIG. 5 is a drawing showing the facsimile receiving sequence of a conventional facsimile apparatus.

In the above presence mode, when the calling station onhooks the handset during the calling period 15, it will not be billed. Therefore, the defect of a conventional apparatus that the calling station is billed though no person is at the called station during the period of call signal 33 shown in FIG. 5 can be eliminated.

Furthermore, the length of the calling period 15 can be adjusted beforehand depending on the situation, so that it can be prevented that the called station receives facsimile after the calling station is forced to wait for a long period of time meaninglessly.

Furthermore, it is possible that the called station detects the CNG signal transmitted by the calling station during the period of MSG 18 or the period of MSG 18 and above silence interval and starts receiving of facsimile. In this case, to prevent a malfunction of detection of the CNG signal by the voice of MSG 18, the frequency component of the CNG signal is removed from the above voice by a filter or a voice from which the frequency component of the above CNG signal is removed beforehand is used.

In the absence mode in FIG. 1, the aforementioned ringing is not required, so that the calling period 15 is omitted and the called station immediately starts the above MSG 18 and subsequent sequence after incoming of call.

The switching method of the present invention shown in FIG. 1 can be applied to a facsimile apparatus which is connected with an automatic answering telephone set. When the automatic answering telephone set is full of incoming messages which have been recorded, the called station carries out ringing by predetermined times during the calling period 15. In the case of no offhook, the called station transmits an MSG 18 to calling station so as to notify it of "absence", transmits a CED signal after the silence interval, and starts receiving of facsimile. By doing this, it can be prevented that the calling station is surprised to hear a strange sound of the CED signal suddenly after the predetermined number of ringings of telephone.

Whether the automatic answering telephone set is full of incoming messages recorded or not is judged by offhook or no offhook of the automatic answering telephone set during the period of the above predetermined number of ringings.

The above number of ringings can be set optionally by the called station using the switch and it can be set also for incoming without ringing.

Figure 2:
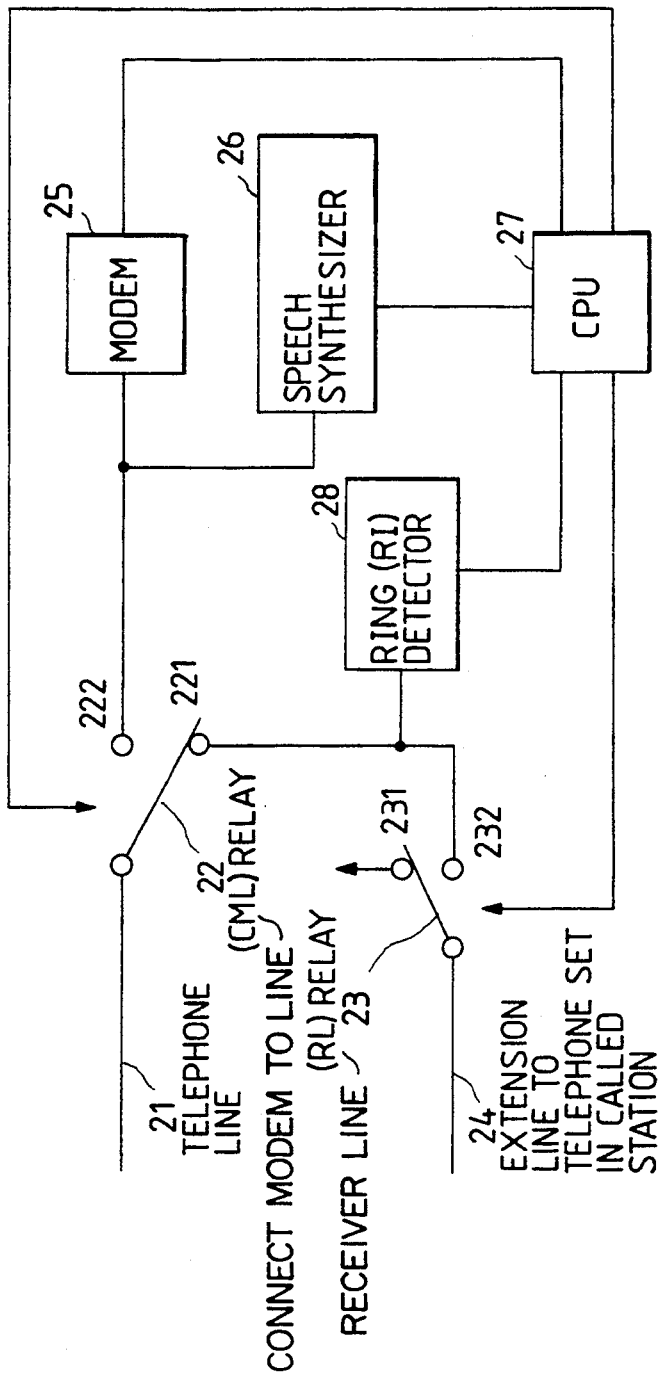
FIG. 2 is a block diagram of a sequence control circuit of a first embodiment of the facsimile apparatus of the present invention.

FIG. 2 shows a sequence control circuit of a facsimile apparatus of a first embodiment of the present invention. In FIG. 2, a reference numeral 21 denotes a telephone line from the calling station and 24 an extension line to a telephone set at the called station.

In the initial state in the presence mode, the telephone line 21 is connected to a telephone set side 221 of a CML (Connect Modem to Line) relay 22. When rung from the telephone central office, an RI (ring) detector 28 detects the ring tone and a CPU 27 monitors the number of ring tones, judges that the called station does not offhook the handset before the number of ring tones reaches a predetermined number (for example, 10 times which are initialized), switches the CML relay 22 to the 222 side (facsimile side), and allows a speech synthesizer 26 to output a message 18 so as to notify the calling station of "absence".

Furthermore, the called station continues the above ringing also during sending of the message 18 and switches an RL (Receiver Line) relay to the 232 side when the handset of the called station is offhooked so as to allow talking.

When the handset of the called station is not offhooked during this period, the called station sends a CED signal from a modem 25 after a silence interval of about 5 seconds and receives facsimile.

The calling station is billed only for the MSG 18 and subsequent sequence by the above sequence, so that the defect of a conventional apparatus that the calling station is forced to wait during the calling period 15 and billed can be prevented.

Figure 3:
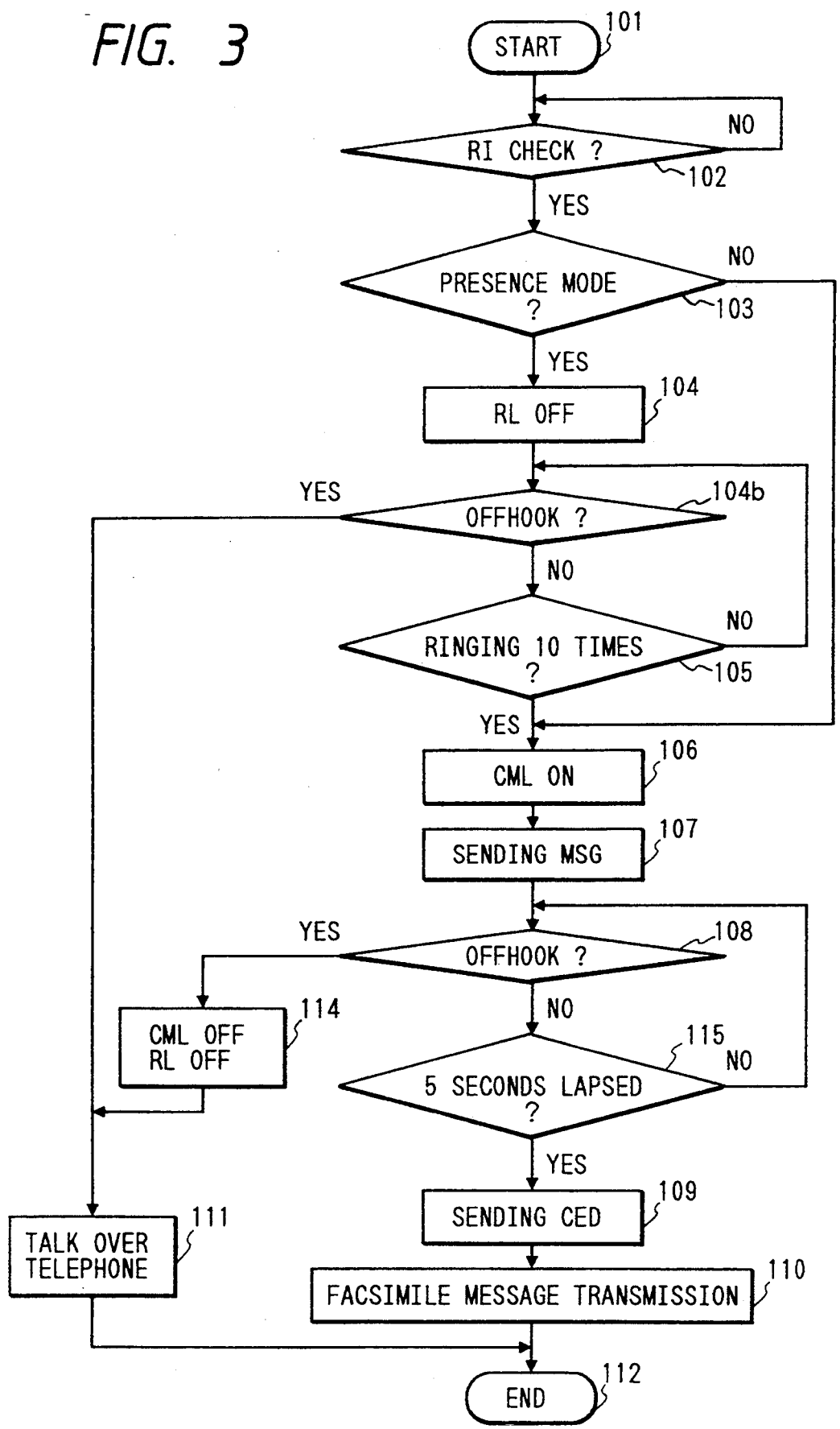
FIG. 3 is a flow chart showing an example of the facsimile receiving method of the present invention.

An example of the method of the present invention will be explained with reference to the flow chart shown in FIG. 3.

The facsimile apparatus of the called station carries out the above RI detection at Step 102 and checks whether the mode switch is set at the presence mode position at Step 103. When the presence mote is selected, the facsimile apparatus connects the RL relay 23 to the 232 side at Step 104 and waits for offhook of the called station at Step 104b.

When the handset of the called station is offhooked, the facsimile apparatus starts talking at Step 111. When the handset of the called station not offhooked, the facsimile apparatus detects that the number of ringings reaches 10 times at Step 105, connects the CML relay 22 to the 222 side at Step 106, and sends an MSG 18 to the calling station at Step 107.

Next, the facsimile apparatus checks whether the handset of the called station is offhooked during sending of the MSG 18 at Step 108. When the handset is offhooked, the facsimile apparatus connects the CML relay 22 to the 221 side at Step 114, connects the RL relay 23 to the 232 side, and starts talking.

When the handset is not offhooked, the facsimile apparatus detects that the above silence interval of 5 seconds elapses at Step 115, transmits a CED signal at Step 109, and receives facsimile message transmission at Step 110.

Figure 4:
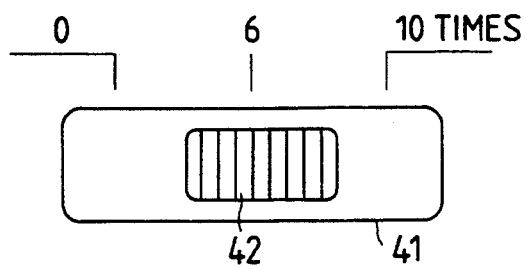
FIG. 4 is a schematic view of an example of a switch for selecting the number of ringings which is used for the facsimile apparatus of the present invention.

FIG. 4 shows an example of a switch 41 which is used to set the number of ringings which is counted at Step 105. The number of ringings can be set to, for example, 0 to 10 by one-touch operation by moving a slide button 42.

In the presence mode of the facsimile apparatus of the above first embodiment, ringing of telephone is carried out first for both telephone call and facsimile call. Therefore, when the calling station of telephone judges that the called station is in the absence state during this ringing period and onhooks the handset, the calling station will not be billed.

Furthermore, the calling station of facsimile is notified of "absence" by voice after the above ringing period and then of "facsimile receivable". Therefore, even an inexperienced person can transmit facsimile messages without anxiety.

Furthermore, the above number of ringings of telephone can be set optionally by one-touch operation. Therefore, in the case of absence, when the number of ringings is set to zero before the user leaves his house, the facsimile apparatus sends the above voice message simultaneously with incoming of call so as to notify the calling station of "absence" and can receive facsimile messages immediately.

Furthermore, in the case of absence, when the absence mode is selected beforehand, the above ringing of telephone can be omitted. Therefore, the facsimile apparatus sends the above voice message simultaneously with incoming of call so as to notify the calling station of "absence" and can receive facsimile messages immediately.

Furthermore, a silence interval of about 5 seconds is set after the above voice message and then a CED signal is transmitted. Therefore, it can be prevented that the calling station is surprised to hear a strange sound of the CED signal suddenly after the voice message.

Furthermore, when an automatic answering telephone set is used and it is full of incoming messages recorded, the facsimile apparatus notifies the calling station of it by voice answering and can receive facsimile messages in the same way hereafter.

According to the first embodiment, even if the user leaves his house with the facsimile apparatus always set in the presence mode, the calling station will be bothered little. Therefore, the called station can be released from a trouble of setting the presence mode whenever the user leaves his house.

Figure 9:
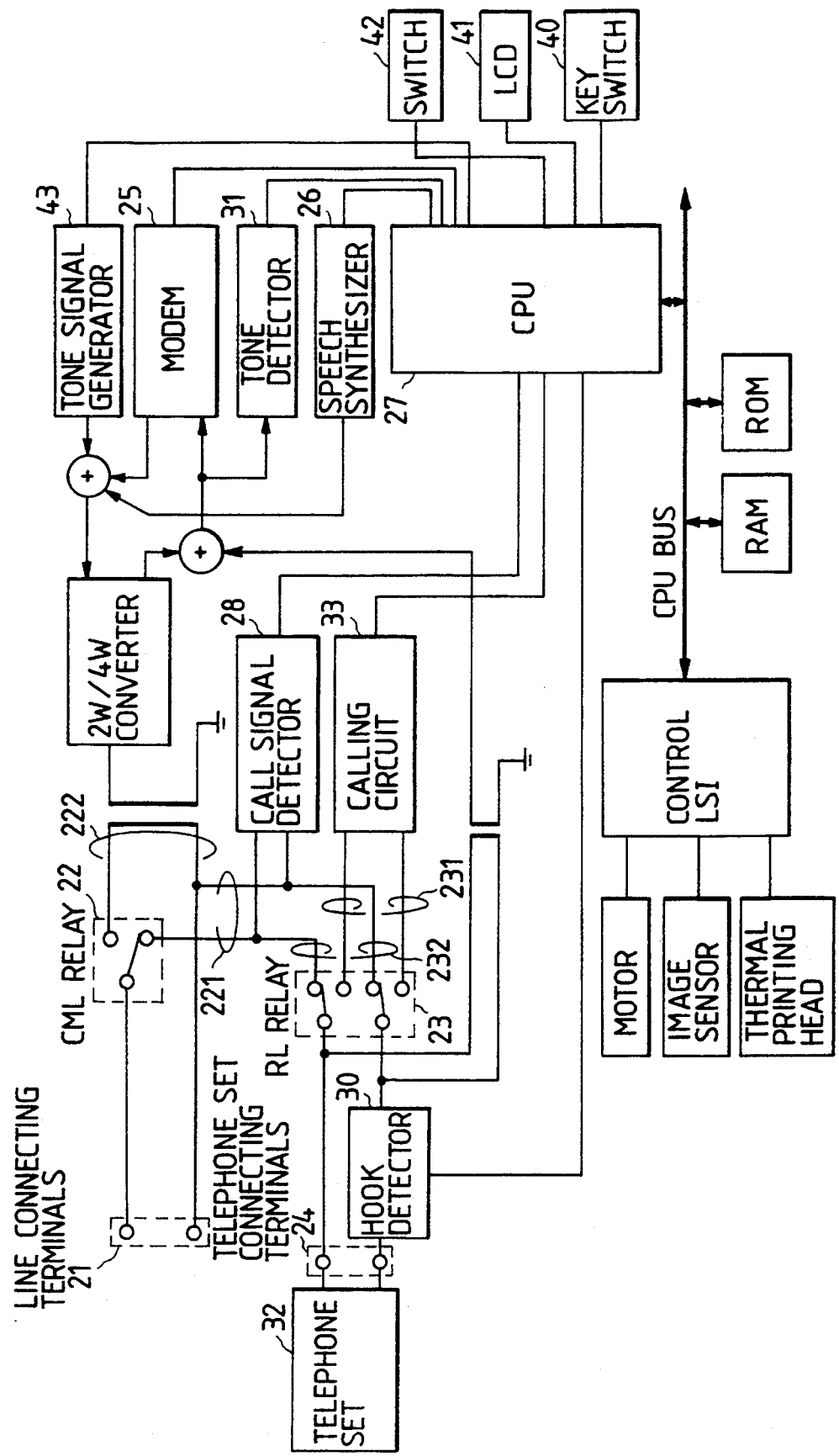
FIG. 9 is a block diagram of the second embodiment of the facsimile apparatus of the present invention.

FIG. 9 shows a circuit of a facsimile apparatus of a second embodiment of the present invention.

In FIG. 9, an image sensor reads documents to be transmitted through the facsimile so that the document information is converted to electric signals. A thermal printing head prints documents decoding to received facsimile signals. A motor is provided to move a sheet of the documents to the image sensor so as to he read by the image sensor, and move a sheet to the thermal printing head so as to be printed by the thermal printing head. A control LSI controls the operation of the motor, the image sensor and the thermal printing head.

A two-wire to four-wire converter separates received signals and transmitting signals from each other so that the received signals are applied to a modem 25 while the output signals delivered out to the modem 25 are transmitted to the telephone line. The modem 25 encodes input analog signals to digital signals and decodes input digital signals to analog signals.

Terminals 21 connect the facsimile apparatus to the telephone lines and terminals 24 connect the facsimile apparatus to the telephone set 32. Hook detector 30 is provided for detecting whether the telephone set 32 is "off-hook". A CPU 27 is provided for controlling operation of the facsimile apparatus. An LCD (liquid crystal display) 41 connected to the CPU 27 displays messages to the user.

As shown in FIG. 9, the facsimile apparatus of the present embodiment has a switch 42 for specifying one of the three types of modes such as the manual answering mode, automatic answering mode, and auto answering message telephone connection mode. In the manual answering mode, facsimile messages cannot be received unless the facsimile apparatus is manually operated. The automatic answering mode includes a telephone priority mode and facsimile priority mode, which can be selected by pressing a key switch 40 at least two times by the user. Therefore, there are four types of answering modes in total. According to the facsimile apparatus of the present embodiment, the setting of the number of ringings at incoming of call and the use of answering messages can be selected also by pressing the key switch 40 at least two times by the user.

Figure 6:
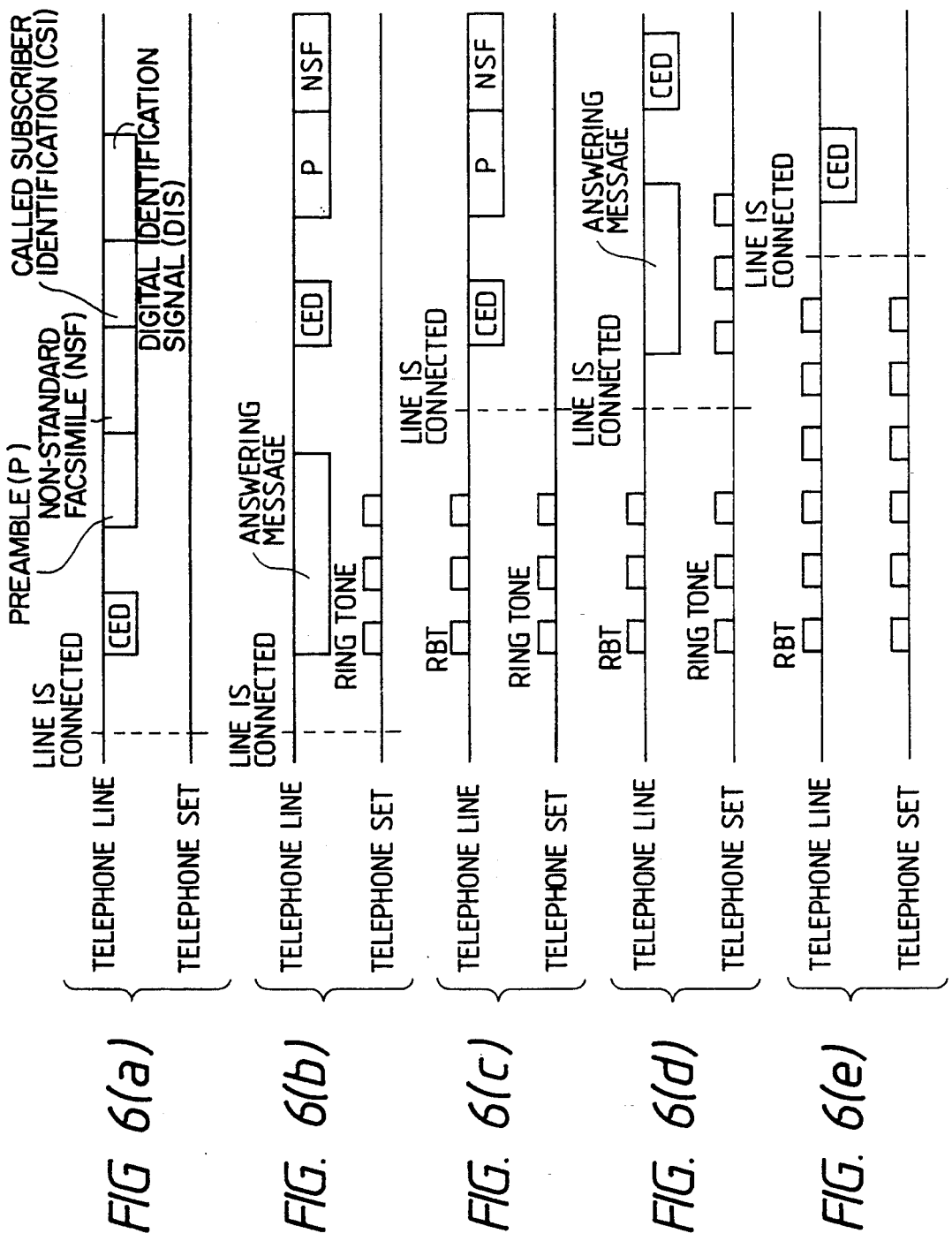
FIGS. 6(a), 6(b), 6(c), 6(d), and 6(e) are drawings showing the sequence of signals in the telephone priority mode in a second embodiment of the facsimile apparatus of the present invention.

FIG. 6(a) is a sequence drawing in the telephone priority mode when the number of ringings is set at 0. In the block diagram shown in FIG. 9, initially, the relay 22 is set on the circuit 221 side and the relay 23 is set on the circuit 232 side. When a call signal (16 Hz) from the telephone central office is detected by a call signal detector 28, the facsimile apparatus switches the relay 22 to the circuit 222 side so as to connect the line, sends a CED signal, and starts receiving of a facsimile message. Therefore, in this case, there is no ringing.

FIG. 6(b) is a sequence drawing when the number of ringings is set at 3. In the block diagram shown in FIG. 9, initially, the relay 22 is set on the circuit 221 side and the relay 23 is set on the circuit 232 side. When a call signals from the telephone central office is detected by the call signal detector 28, the facsimile apparatus switches the relay 22 to the circuit 222 side and simultaneously switches the relay 23 to the circuit 231 side. The speech synthesizer 26 transmits an answering message of "I am out now. Please phone later once again or transmit a facsimile message after the tone." to the calling station and simultaneously the facsimile apparatus activates a calling circuit 33 and makes a telephone set 32 ring. When the telephone set 32 is not offhooked before the sending of the answering message ends, the facsimile apparatus transmits a CED signal after a silence interval of 2 seconds and starts receiving of a facsimile message. By doing this, the person at the calling station can onhook the handset during this silence interval and will not be surprised to hear the CED signal.

FIG. 6(c) is a sequence drawing when the number of ringings is set at 3 and no answering messages are transmitted. In the block diagram shown in FIG. 9, the relay 22 is set on the circuit 221 side and the relay 23 is set on the circuit 232 side. When a call signal is detected by the call signal detector 28 continuously three times, the facsimile apparatus switches the relay 22 to the circuit 222 side so as to connect the line. Thereafter, the facsimile apparatus sends a CED signal and starts receiving of a facsimile message.

FIG. 6(d) is a sequence drawing when the number of ringings is set at 6 and answering messages are transmitted. In the block diagram shown in FIG. 9, the relay 22 is set on the circuit 221 side and the relay 23 is set on the circuit 232 side. When a call signal is detected by the call signal detector 28 continuously three times, the facsimile apparatus switches the relay 22 to the circuit 222 side and simultaneously switches the relay 23 to the circuit 231 side. The facsimile apparatus activates the speech synthesizer 26 and sends an answering message which is the same as that shown in FIG. 6(b) to the line. Simultaneously, the facsimile apparatus activates the calling circuit 33 and makes the telephone set 32 ring. Since the answering message requires about 8 seconds, three ringings are made. As a result, 6 ringings in total including ringings from the telephone central office are made. When the telephone set 32 is not offhooked during this period of ringing, the facsimile apparatus transmits a CED signal after a silence interval of at least 2 seconds and starts receiving of a facsimile message.

FIG. 6(e) is a sequence drawing when the number of ringings is set at 6 and no answering messages are transmitted. In the block diagram shown in FIG. 9, the relay 22 is set on the circuit 221 side and the relay 23 is set on the circuit 232 side. When a call signal from the telephone central office is detected by the call signal detector 28 continuously six times, the facsimile apparatus switches the relay 22 to the circuit 222 side so as to connect the line, sends a CED signal, and starts receiving of a facsimile message.

In the telephone priority mode, as mentioned above, the calling station will not be billed during the period that a ringback tone is heard.

FIG. 7(a) is a sequence drawing in the facsimile priority mode when the number of ringings is set at 0. In the block diagram shown in FIG. 9, the relay 22 is set on the circuit 221 side and the relay 23 is set on the circuit 231 side (opposite to the side shown in FIG. 9). When a call signal (16 Hz) from the telephone central office is detected by the call signal detector 28, the facsimile apparatus switches the relay 22 to the circuit 222 side so as to connect the line, sends a CED signal, and starts receiving of a facsimile message. Therefore, in this case, there is no ringing.

FIG. 7(b) is a sequence drawing when the number of ringings is set at 3 and answering messages are transmitted. In the block diagram shown in FIG. 9, the relay 22 is set on the circuit 221 side and the relay 23 is set on the circuit 231 side (opposite to the side shown in FIG. 9). When a call signal from the telephone central office is detected by the call signal detector 28, the facsimile apparatus switches the relay 22 to the circuit 222 side. A tone detector 31 detects a CNG tone for 2 seconds. When the CNG tone is detected, the facsimile apparatus sends a CED signal and starts receiving of a facsimile message. When the CNG tone is not detected, the facsimile apparatus activates the speech synthesizer 26 and sends an answering message of "Ringing now" for at most 3 seconds. Then, the facsimile apparatus activates a tone signal generator 43 and sends a pseudo-ringback tone two times for about 5 seconds. This pseudo-ringback tone is a 400-Hz modulated tone which is similar to a ringback tone from the telephone central office. By doing this, the calling station can confirm that the called station answers and simultaneously finds that the called station is ringing now. The CNG tone detection is performed also during sending of this pseudo-ringback tone. When the CNG tone is detected, the facsimile apparatus sends a CED signal and starts receiving of a facsimile message. By doing this, even when the calling station uses an automatic transmission facsimile apparatus, the called station can receive facsimile messages without delay. After sending the pseudo-ringback tone, the facsimile apparatus activates the speed synthesizer 26 and transmits an answering message of "I am out now. Please phone later once again or transmit a facsimile message after the tone." to the calling station. Simultaneously, the facsimile apparatus activates the calling circuit 33 and makes the telephone set 32 ring. Since the answering message requires about 8 seconds, three ringings are made. When the telephone set 32 is not offhooked during this period, the facsimile apparatus transmits a CED signal after 2 seconds and starts receiving of a facsimile message.

FIG. 7(c) is a sequence drawing when the number of ringings is set at 3 and no answering messages are transmitted. In the block diagram shown in FIG. 9, the relay 22 is set on the circuit 221 side and the relay 23 is set on the circuit 231 side (opposite to the side shown in FIG. 9). When a call signal from the telephone central office is detected by the call signal detector 28, the facsimile apparatus switches the relay 22 to the circuit 222 side, activates the tone signal generator 43 and tone detector 31, sends a pseudo-ringback tone for 5 seconds, and simultaneously detects the CNG tone. When the CNG tone is detected, the facsimile apparatus sends a CED signal and starts receiving of a facsimile message. When the CNG signal is not detected, the facsimile apparatus activates the tone signal generator 43 and calling circuit 33 simultaneously, sends the pseudo-ringback tone to the line, and simultaneously makes the telephone set 32 ring. When the telephone set 32 is not offhooked during this period, the facsimile apparatus transmits a CED signal and starts receiving of a facsimile message.

Figure 7:
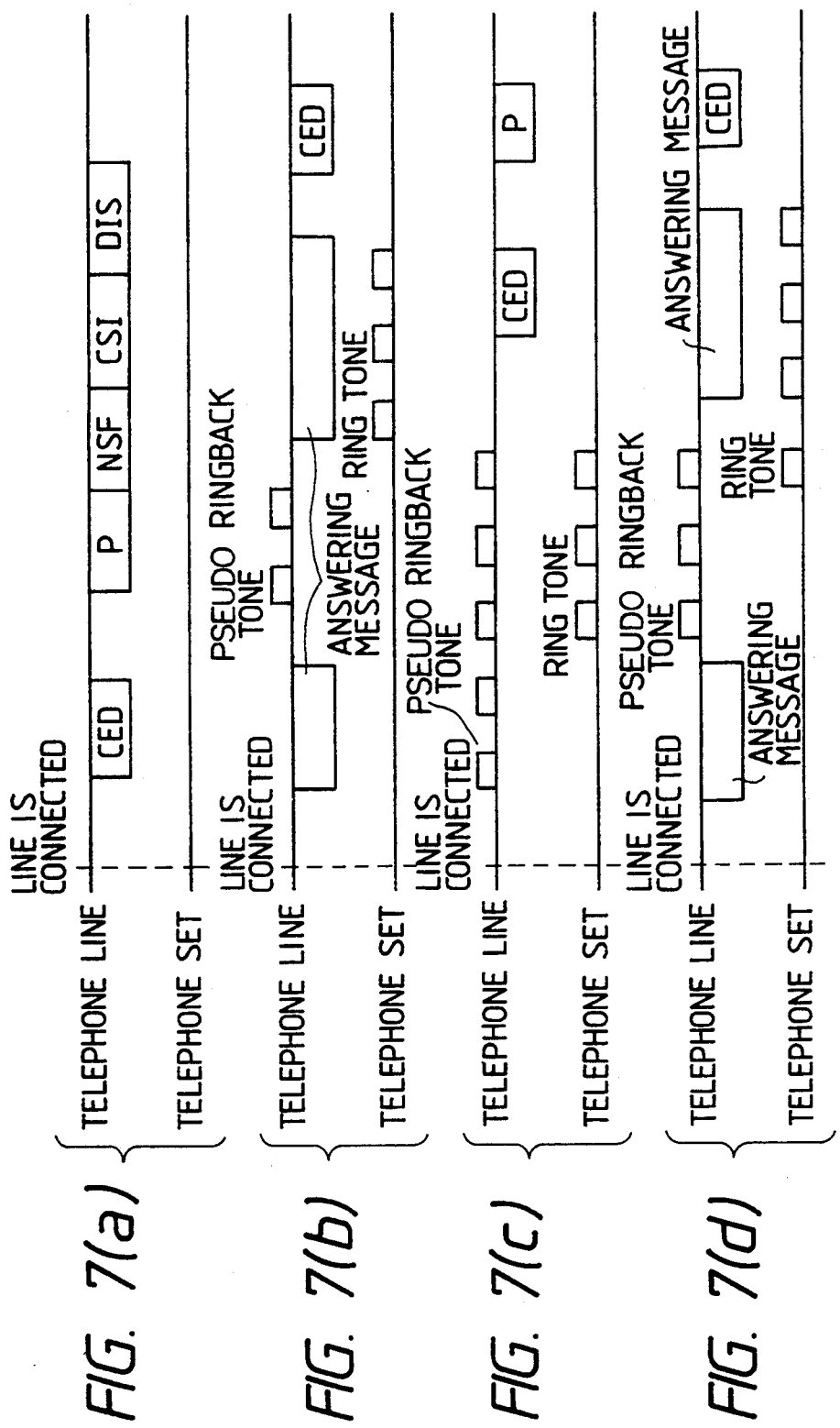
FIGS. 7(a), 7(b), 7(c), and 7(d) are drawings showing the sequence of signals in the facsimile priority mode in the second embodiment of the facsimile apparatus of the present invention.

FIG. 7(*d*) is a sequence drawing when the number of ringings is set at 4 and answering messages are transmitted. In the block diagram shown in FIG. 9, the relay 22 is set on the circuit 221 side and the relay 23 is set on the circuit 231 side (opposite to the side shown in FIG. 9). The sequence is the same as that shown in FIG. 7(*b*) except that the tone signal generator 43 sends the pseudo-ringback tone three times and when the pseudo-ringback tone is sent third, the facsimile apparatus activates the calling circuit 33 and makes the telephone set 32 ring four times.

Figure 8:
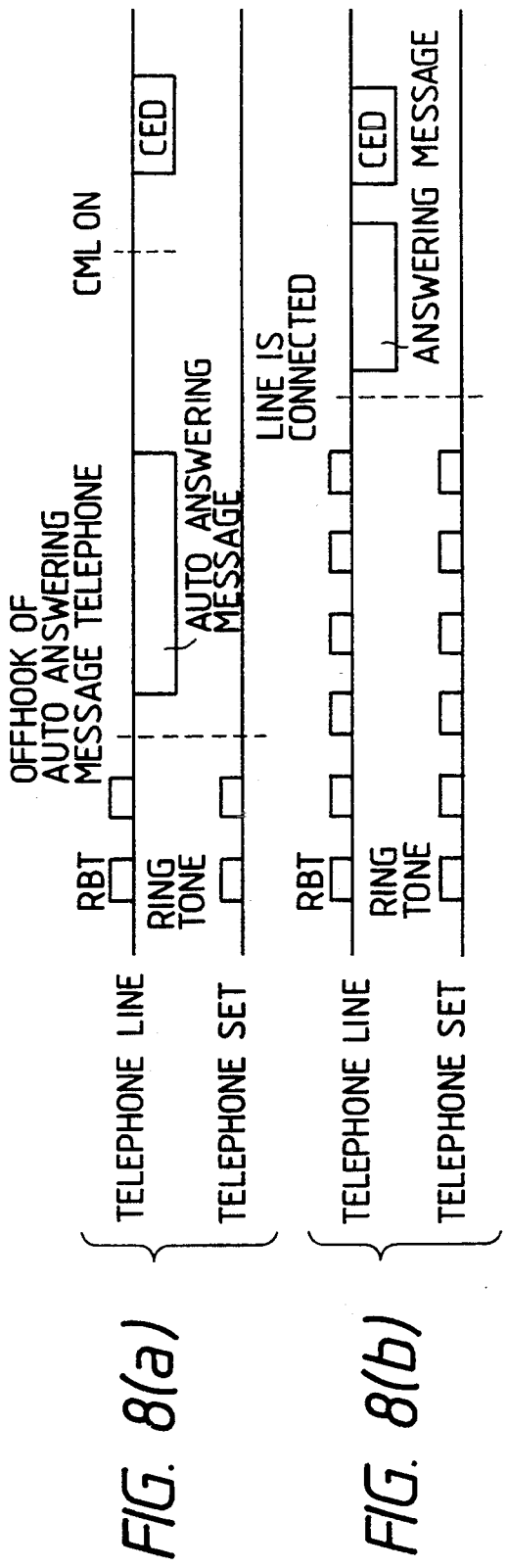
FIGS. 8(a) and 8(b) are drawings showing the sequence of signals in the auto answering message telephone connection mode in the second embodiment of the facsimile apparatus of the present invention.

FIG. 8(*a*) is a sequence drawing in the auto answering message telephone connection mode when an automatic answering telephone set is set in the absence mode. In the block diagram shown in FIG. 9, the relay 22 is set on the circuit 221 side and the relay 23 is set on the circuit 232 side. When a call signal from the telephone central office is received, the automatic answering telephone set is offhooked at the second call signal and an answering message of the automatic answering telephone set is sent to the line. According to this message, the calling station records a message in the automatic answering telephone set. When the calling station uses a facsimile apparatus, it is expected that there is a silence or a CNG signal during this message recording period. When a silence or CNG tone for at least 6 seconds is detected by the tone detector 31, the facsimile apparatus switches the relay 22 to the circuit 222 side, sends a CED signal, and starts receiving of a facsimile message. By doing this, even when the calling station uses a facsimile apparatus, the called station can receive facsimile messages without delay.

FIG. 8(*b*) is a sequence drawing in the auto answering message telephone connection mode when an automatic answering telephone set is set in the presence mode or the automatic answering telephone set is full of incoming messages recorded. The status of the block diagram shown in FIG. 9 is the same as that of FIG. 8(*a*). When the automatic answering telephone set is not offhooked even if a call signal from the telephone central office is received 10 times, the facsimile apparatus switches the relay 22 to the circuit 222 side, activates the speed synthesizer 26, and transmits an answering message of "I am out now. Please phone later once again or transmit a facsimile message after the tone." to the calling station. After 2 seconds, the facsimile apparatus transmits a CED signal and starts receiving of a facsimile message.

According to the facsimile apparatus of the second embodiment of the present invention, one of the three types of modes such as the manual answering mode, automatic answering mode, and auto answering message telephone connection mode can be easily selected according to the use condition of the facsimile apparatus by the user. Furthermore, in the automatic answering mode, by selecting the telephone priority mode or facsimile priority mode as well as by selecting whether or not to send a voice answering message and setting the number of ring tones of the telephone set in the called station, the called station can perform communication of facsimile messages or make ordinary telephone calls without a feeling of mental uneasiness of the calling station and time delay.

What is claimed is:

1. A facsimile receiving method usable for a facsimile system in which a telephone line is used for both telephone calling or answering and facsimile calling or answering by automatically switching telephone or facsimile, said method comprising the steps of:

carrying out ringing of a telephone in a called station for a predetermined period without a called station identification signal being transmitted from the called station to a calling station even when a calling signal transmitted from the telephone central office is received by the called station and a facsimile calling tone signal is transmitted from the calling station;

detecting whether a handset of the called station is offhooked during said predetermined period of ringing of the telephone or not; and transmitting a voice message meaning "Absence" and "Transmit a facsimile message, if any" from the called station to the calling station when it is detected that the handset of the called station is not offhooked.

2. A method according to claim 1, further comprising the step of transmitting a called station identification signal from the called station to the calling station after said message is transmitted to the calling station and then a predetermined silence interval elapses.

3. A method according to claim 2, wherein said offhook detection is continued during the period of said message being transferred to the calling station and said silence interval.

4. A method according to claim 2, wherein said facsimile calling tone signal transmitted from the calling station is detected at least during said silence interval.

5. A method according to claim 3, wherein said facsimile calling tone signal transmitted from the calling station is detected at least during said silence interval.

6. A method according to claim 1, wherein a frequency component equivalent to the frequency of said facsimile calling tone signal is removed from said voice message.

7. A method according to claim 2, wherein a frequency component equivalent to the frequency of said facsimile calling tone signal is removed from said voice message.

8. A method according to claim 3, wherein a frequency component equivalent to the frequency of said facsimile calling tone signal is removed from said voice message.

9. A method according to claim 4, wherein a frequency component equivalent to the frequency of said facsimile calling tone signal is removed from said voice message.

10. A method according to claim 5, wherein a frequency component equivalent to the frequency of said facsimile calling tone signal is removed from said voice message.

11. A facsimile receiving method usable for a facsimile system in which a telephone line is used for both an automatic answering telephone set and facsimile apparatus by automatically switching the automatic answering telephone set or facsimile apparatus, said method comprising the steps of:

carrying out ringing of an automatic answering telephone set by a called station for a predetermined period without a called station identification signal being transmitted from the called station to a calling station even when a recording capacity of the automatic answering telephone set is full of incoming messages, and a calling signal transmitted from the telephone central office is received by the called station, and a facsimile calling tone signal is transmitted from the calling station;

detecting whether the automatic answering telephone set of the called station is offhooked during said predetermined period of ringing of the automatic answering telephone set or not; and transmitting a voice message meaning "Absence" and "Transmit a facsimile message, if any" from the called station to the calling station when it is detected that the automatic answering telephone set of the called station is not offhooked.

12. A method according to claim 11, further comprising the step of transmitting a called station identification signal from the called station to the calling station after said message is transmitted to the calling station and then a predetermined silence interval elapses.

13. A method according to claim 12, wherein said offhook detection is continued during the period of said message being transferred to the calling station and said silence interval.

14. A method according to claim 11, wherein said facsimile calling tone signal transmitted from the calling station is detected at least during said silence interval.

15. A method according to claim 12, wherein said facsimile calling tone signal transmitted from the calling station is detected at least during said silence interval.

16. A method according to claim 11, wherein a frequency component equivalent to the frequency of said facsimile calling tone signal is removed from said voice message.

17. A method according to claim 12, wherein a frequency component equivalent to the frequency of said facsimile calling tone signal is removed from said voice message.

18. A method according to claim 13, wherein a frequency component equivalent to the frequency of said facsimile calling tone signal is removed from said voice message.

19. A method according to claim 14, wherein a frequency component equivalent to the frequency of said facsimile calling tone signal is removed from said voice message.

20. A method according to claim 15, wherein a frequency component equivalent to the frequency of said facsimile calling tone signal is removed from said voice message.

21. A facsimile receiving method usable for a facsimile system in which a telephone line is used for both telephone calling or answering and facsimile calling or answering by automatically switching telephone or facsimile, said method comprising the steps of:

transmitting a voice message meaning "Absence" and "Transmit a facsimile message, if any" from a called station to a calling station without carrying out ringing of the telephone in a called station and without a called station identification signal being transmitted from the called station to the calling station when the called station is set in the absence mode and a call signal transmitted from the telephone central office is received by the called station; and transmitting a called station identification signal from the called station to the calling station after said voice message is transmitted to the calling station.

22. A method according to claim 21, wherein said called station identification signal is transmitted to the calling station after said message is transmitted to the calling station and then a predetermined silence interval elapses.

23. A method according to claim 22, wherein said facsimile calling tone signal transmitted from the calling station is detected at least during said silence interval.

24. A facsimile apparatus usable for a facsimile system in which a telephone line is used for both telephone calling or answering and facsimile calling or answering by automatically switching telephone or facsimile, said apparatus comprising:

means for detecting a call signal transmitted from a telephone central office;

means for carrying out ringing of telephone by a called station for a predetermined period without a called station identification signal being transmitted from the called station to a calling station even when a calling signal is detected and a facsimile calling tone signal is transmitted from the calling station;

means for detecting whether a handset of the called station is offhooked during said predetermined period of ringing of telephone or not;

means for transmitting a voice message meaning "Absence" and "Transmit a facsimile message, if any" from the called station to the calling station when it is detected that the handset of the called station is not offhooked during said predetermined period of ringing of telephone; and means for removing a frequency component equivalent to the frequency of said facsimile calling tone signal from said voice message, 25. A facsimile apparatus usable for a facsimile system in which a telephone line is used for both telephone calling or answering and facsimile calling or answering by automatically switching telephone or facsimile, said apparatus comprising:

means for detecting a call signal transmitted from a telephone central office;

means for carrying out ringing of telephone by a called station for a predetermined period without a called station identification signal being transmitted from the called station to a calling station even when a calling signal is detected and a facsimile calling tone signal is transmitted from the calling station;

means for detecting whether a handset of the called station is offhooked during said predetermined period of ringing of telephone or not; and means for transmitting a voice message meaning "Absence" and "Transmit a facsimile message, if any" from the called station to the calling station when it is detected that the handset of the called station is not offhooked during said predetermined period of ringing of telephone;

wherein said means for transmitting a voice message transmits a voice message which does not include a frequency component equivalent to the frequency of said facsimile calling tone signal.

* * * * *